United States Patent
Churchill et al.

[11] 3,732,060
[45] May 8, 1973

[54] WELDING AND CUTTING UNIT

[75] Inventors: John P. Churchill, Indiatlantic; Tommy Lewis Thompson, Melbourne, both of Fla.

[73] Assignee: Life Support, Inc., Melbourne, Fla.

[22] Filed: May 17, 1971

[21] Appl. No.: 143,854

[52] U.S. Cl. ..................431/344, 23/281, 222/3, 222/145, 239/306
[51] Int. Cl. ..................................F23d 13/04
[58] Field of Search ..................23/281; 431/344; 239/304, 305, 306; 222/3

[56] References Cited

UNITED STATES PATENTS

| | | | |
|---|---|---|---|
| 3,246,849 | 4/1966 | Aske | 239/304 |
| 3,253,787 | 5/1966 | Stutzman | 239/305 |
| 3,285,286 | 11/1966 | Jakubowski | 222/394 X |
| 3,314,572 | 4/1967 | Pungitore | 222/394 X |
| 3,575,319 | 4/1971 | Safianoff | 239/304 X |
| 1,227,881 | 5/1917 | Bruckner | 239/304 |
| 2,983,588 | 5/1961 | Bovard | 23/281 |

FOREIGN PATENTS OR APPLICATIONS

| | | | |
|---|---|---|---|
| 461,654 | 2/1937 | Great Britain | 431/344 |

Primary Examiner—Carroll B. Dority, Jr.
Attorney—Hill, Sherman, Meroni, Gross & Simpson

[57] ABSTRACT

A lightweight, portable apparatus for welding or cutting supplied with fuel and oxygen from canisters, one of which houses a chemical oxygen generator. The canisters may be suspended directly from the welding or cutting torch or may be connected thereto through flexible hoses. When suspended from the torch, the canisters may be rotated to desired out-of-the-way positions. The oxygen generator canister is encased in a heat shield and a relief valve is provided to prevent undesired pressure build-up in the generator.

8 Claims, 7 Drawing Figures

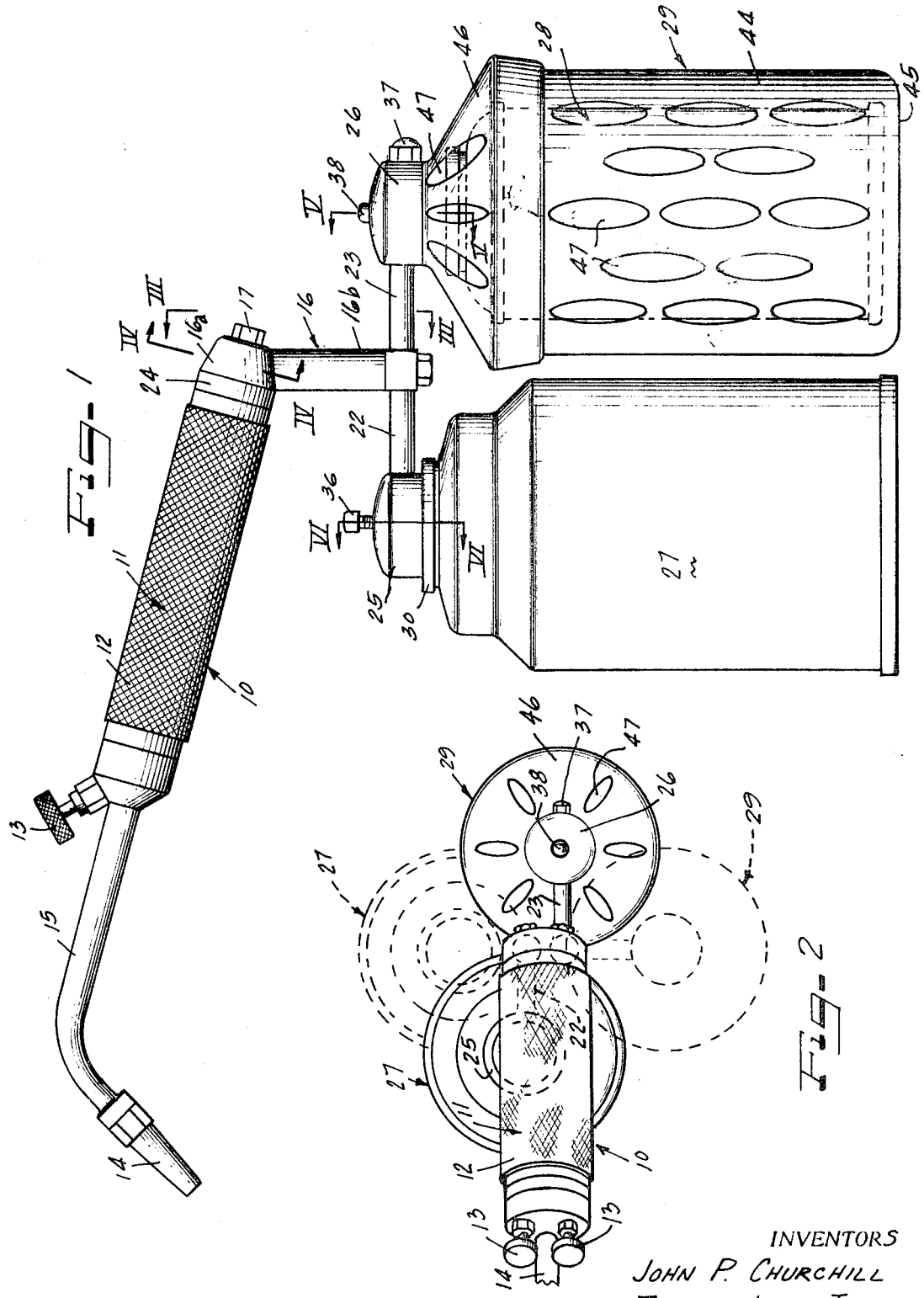

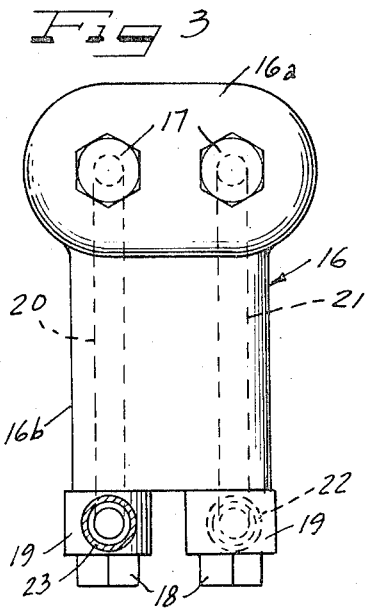
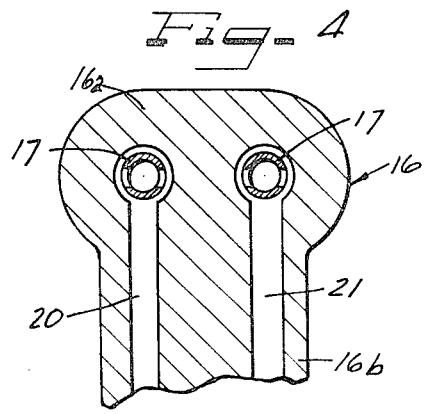
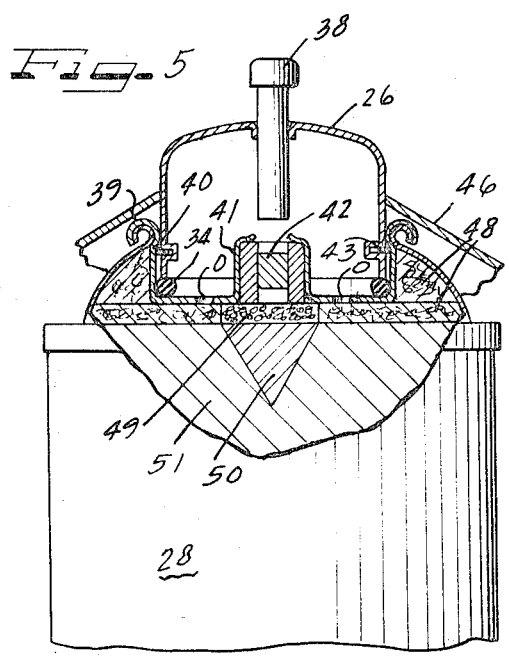
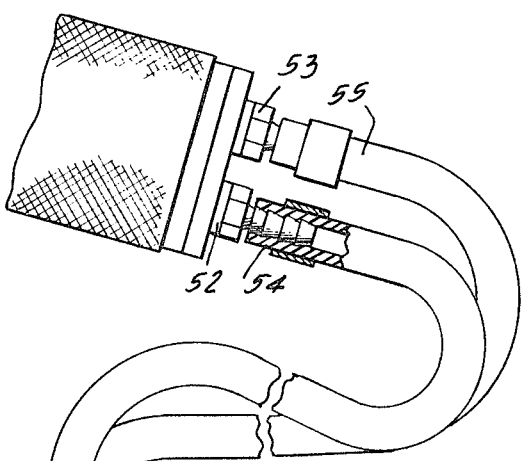
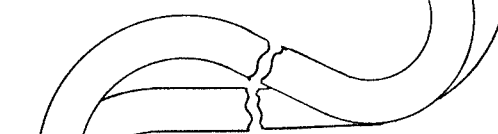
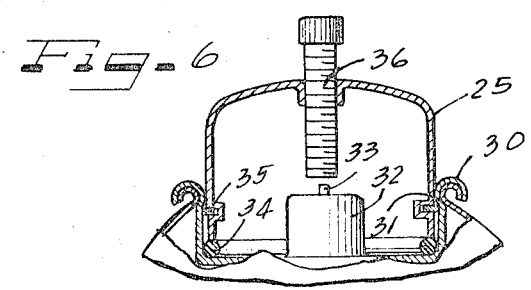

WELDING AND CUTTING UNIT

BACKGROUND OF THE INVENTION

1. Field of the Invention

This invention relates to the art of portable, lightweight welding or cutting torches equipped with canisters supplying fuel and oxygen wherein the oxygen supplying canister is in the form of a chemical generator instantaneously actuated only when needed, thereby avoiding heretofore necessary heavy cumbersome oxygen bottles or tanks. In the preferred form of the invention the canisters are of the aerosol type easily connected to delivery heads that can be either directly suspended from the torch or connected thereto through flexible hoses.

2. Description of the Prior Art

It has not heretofore been practical to provide lightweight, portable welding or cutting torches with their own supply of oxygen because of the heavyweight and large size of oxygen bottles capable of supplying any appreciable quantity of oxygen for sustained use of the torch. Suspension of fuel and oxygen tanks from the torch rendered the resulting assembly too heavy and cumbersome to handle.

SUMMARY OF THE INVENTION

The present invention now provides a self-sustained welding and cutting torch having its own chemical oxygen generator and being sufficiently compact and light in weight to be easily handled and manipulated into desired positions for use. Oxygen and fuel are supplied to the torch from canisters with the oxygen supply developed as needed from chemicals in the canister. The generator is activated from a firing pin, chemical starting material or the like which is activated just prior to intended use of the torch so that pressures are not developed until needed, and fire and explosion hazards are eliminated.

It is then an object of this invention to provide a self-supplied welding and cutting torch with its own portable oxygen generator and portable fuel supply.

Another object of this invention is to provide a welding and cutting unit having its own portable canisters of fuel and oxygen which are easily replaceable and activated when needed.

A specific object of this invention is to provide a torch for welding, brazing, metal cutting and the like having suspended therefrom canisters which supply the fuel and oxygen to the torch.

Another specific object of the invention is to provide a welding and cutting torch with a fixture at the rear end thereof suspending fuel supply and oxygen supply canisters.

Another object of this invention is to provide a torch using oxygen with a chemical oxygen generator housed in a replaceable canister.

Still another specific object of this invention is to provide a torch with a portable oxygen generator activated when needed through ignition mechanism.

Other and further objects of this invention will be apparent to those skilled in this art from the following detailed description of the annexed sheets of drawings which, by way of preferred examples, illustrate several embodiments of the invention.

BRIEF DESCRIPTION OF THE DRAWINGS

FIG. 1 is a side elevational view of a welding and cutting torch having its own fuel and oxygen supply canisters depending therefrom according to this invention;

FIG. 2 is a top plan view of the torch assembly of FIG. 1 showing in dotted lines the manner in which the fuel and oxygen canisters may be rotated from the position of FIG. 1 to convenient lateral positions;

FIG. 3 is a cross-sectional view taken along the line III—III of FIG. 1;

FIG. 4 is a cross-sectional view taken along the line IV—IV of FIG. 1;

FIG. 5 is a cross-sectional view taken along the line V—V of FIG. 1 with the heat shield broken away;

FIG. 6 is a cross-sectional view taken along the line VI—VI of FIG. 1; and

FIG. 7 is a fragmentary top plan view similar to FIG. 2 but illustrating the manner in which the fuel and oxygen supply canisters may be connected to the torch through flexible hoses.

BRIEF DESCRIPTION OF THE PREFERRED EMBODIMENTS

The unit 10 of FIG. 1 includes a conventional oxygen and gas cutting torch 11 with an elongated cylindrical knurled handle portion 12, fingertip mixer controls 13 for gas and oxygen feed to the torch tip 14 mounted on a finger tube 15 projecting from the front end of the handle. The rear end of the handle, according to this invention, has a fitting 16 mounted thereon by a pair of cap screws 17. As shown in FIGS. 3 and 4, this fitting has a head portion 16a for covering the rear end of the torch handle 12 and a depending leg portion 16b. Cap screws 18 secure heads 19 to the bottom of the leg 16b. A pair of passages 20 and 21 through the leg 16b communicate through the heads 19 with tubes 22 and 23. Thus the passage 20 is joined with the tube 22 while the passage 21 communicates with the tube 23. In turn, the passages 20 and 21 communicate in the head 16a with hollow interiors of the fasteners 17 that are ported so that gas flow will be directed from the passage 20 to the fuel passage in the torch 11 and from the passage 21 to the oxygen passage in the torch. The mixer valves 13 then control the flow to the burner head or tip of the torch. A gasket 24 is sandwiched between the head 16a and the end face of the torch handle so that the fasteners 17 will sealingly clamp the head 16a to the rear face of the torch handle and gas flow can only be directed from the fitting 16 to the proper passages in the torch.

The tube 22 has a domed cap 25 on the end thereof while the tube 23 has a domed cap 26 on its rear end. These caps 25 and 26 form receptacles for canisters. The cap 25 detachably suspends an aerosol type canister 27 containing fuel for the torch such as butane, propane, liquefied gas (LPG), etc. The cap 26 suspends an oxygen generator canister 28 encased in a heat shield 29.

The cap 25 fits into the conventional valve cup 30 of an aerosol can which, as shown in FIG. 6, has an internal shoulder 31 just inside the bead portion thereof and has an upstanding central neck 32 carrying the valve 33. An O-ring seal 34 is mounted in the bottom of the cup around the neck 32 and the rim end of the head 25 is bottomed against this O-ring. The head contains a snap ring 35 engaging the shoulder 31 providing a latched connection suspending the canister from the head and sealed by the O-ring 34. A screw plug 36 is sealingly threaded in the top of the cap 25 to depress the valve 33 for releasing the fuel from the canister 27 to the tube 22 which registers with the interior of the cap through a side wall of the cap. In this manner the canister 27 is easily snapped into the cap 25 to be sealingly suspended therefrom and to have its contents released to the tube 22 when its valve 33 is depressed by the plug 36.

The cap 26 is similar to the cap 25 and discharges into the tube 23 in the same manner, but since the canister 28 suspended from this cap 26 is a chemical oxygen generator which when activated will continue to produce oxygen even when the valves 13 in the torch are closed, the cap also carries a relief valve 37 biased to closed position but adapted to pop open when subject to pressures over a predetermined maximum. Instead of a screw plug 36, the cap 26 carries a slidably mounted firing pin 38 in its dome.

The canister 28, best shown in FIG. 5, is a pressure resisting aerosol type of can with the conventional valve cup 39 having an internal shoulder 40 and a central upstanding collar or neck 41. In this instance, however, the neck 41 carries a percussion cap 42 in place of a valve. The percussion cap is of the conventional type used in ammunition cartridges and the like.

As in the case of the fuel canister 27, an O-ring 34 is mounted in the bottom of the cup around the neck 41 to be sealingly engaged by the rim end of the domed cap 26. A snap ring 43 carried in a groove around the domed cap will engage the shoulder 40 to detachably suspend the canister 28 from the cap.

AS explained above, the canister 28 is surrounded by a heat shield having a cylindrical body portion 44 shown in FIG. 1 of larger diameter than the canister 28 to be spaced from the side wall of the canister. The canister 28 rests on the bottom 45 of the cylindrical body 44 and the top of the canister is embraced by a conical lid 46 detachably connected to the body 44 as by screw threads, a snap ring or the like. The apex of the domed cover 46 snugly surrounds the bead of the valve cup 39 so that the canister will be centered in the heat shield. Apertures 47 are provided through the body and domed cover of the heat shield for free circulation of air.

As shown in FIG. 5, the dome of the canister 28 is filled with glass wool mating 48 surrounding the valve cup. The lower portion of the matting is centrally apertured and packed with gun powder or the like ignition material 49 which in turn overlies an ignition cone portion 50 of an oxygen generating chlorate candle 51 mounted in the canister 28. When the firing pin 38 is struck to engage the percussion cap 42, this cap will explode to ignite the powder or other ignition mixture 49 which in turn generates enough heat to start the burning of the cone 50. This cone material is a pyrotechnic mixture that will burn at a relatively slow rate to generate a sufficiently high temperature to start the decomposition of the sodium chlorate constituting the body of the candle 51. A decomposition catalyst such as sodium peroxide is admixed with he sodium chlorate to constitute the candle in proportions that will vary widely depending on the desired rate of oxygen generation. In general, from one-half to 20 percent by weight of sodium peroxide is useful. Oxygen from the candle 51 will flow through orifices "O" in the bottom of the valve cup 39 surrounding the neck 41 (the fired percussion cap 42 may also open up a discharge passage through the neck 41) and the oxygen will flow through the tube 23 to the passage 21 and thence to the torch for proper admixing with the fuel from the canister 27 to generate a very hot flame at the burner head 14. When the canister is not mounted on the cap 26 the orifices "O" may be sealed with an overlying removable cover.

As shown in FIG. 2, the canister 27 and the canister 28 with its surrounding heat shield 29 may be swung to lateral positions relative to the handle 11 since the cap screws 18 can be loosened to permit rotation between the heads 19 and the bottom of the fitting 16.

The fitting 16 is readily detached from the rear of the torch handle 12 by removing the nipple type fasteners 17. The threaded apertures in the rear end of the handle 12 that received these fasteners 17 can also receive the threaded ends of hose adapters 52 and 53 shown in FIG. 7. Hoses 54 and 55 from these adapters can then be connected to the detached fitting 16 through a cap 56 carrying fittings 57 and 58 for the hoses and clamped to the head 16a of the fitting 16 by the same fasteners 17 that were used to connect this head to the rear end of the torch handle 12. In this manner the fuel from the canister 27 and the oxygen generated from the canister 28 can be fed through the same caps 25 and 26 and fitting 16 via hoses 54 and 55 of any desired length to the torch. This provides for a remote location of the fuel and oxygen sources for the torch.

The heat shield 29 surrounding the oxygen canister 28 is preferably composed of a lightweight good heat-transfering metal such as aluminum or magnesium and the ports or holes 47 in this shield accommodate flow of air around the canister to provide a chimney effect for dissipation of heat.

From the above descriptions it should be appreciated that this invention now provides a cutting and welding torch with its own source of fuel and oxygen. The entire assembly of this invention is very light-weight, being in the order of 29 ounces including aerosol type fuel and oxygen generator canisters, and if larger, heavier canisters are desired for more prolonged work they can be remotely mounted as illustrated in FIG. 7 to supply the torch via tubing or hoses or any desired length. It should also be understood that the fuel and oxygen supplying canisters are easily mounted into operative positions and rapidly replaced when exhausted.

We claim as our invention:

1. A cutting and welding torch having its own source of fuel and oxygen which comprises a torch body, a fitting detachably mounted on said body having passages and a tube extending laterally from each passage for supplying fuel and oxygen to the body, canister caps suspended from said tubes and each communicating with a passage in the fitting, a valved fuel canister suspended from one of said caps, means on said one cap for opening the valve of said fuel canister, a chemical oxygen generator canister suspended from the other of said caps, said other cap having means to activate the generator to release oxygen from the suspended canister to the cap, and a ported heat shield surrounding the oxygen generator canister in spaced relation.

2. The torch of claim 1 wherein each suspended canister has a recess in the top end thereof receiving said caps and means uniting the caps with the canisters in sealed relation.

3. The torch of claim 1 wherein the fitting has a head overlying the rear end of the torch body, a leg depending from the head, tubes extending laterally from the bottom of the leg to said caps, and means accommodating swinging of said tubes to selectively position said canisters relative to said torch body.

4. A welding and cutting unit comprising a cutting torch having an elongated cylindrical handle portion having first and second ends, a finger tube projecting from the first end of the handle portion, a burner head on the end of sad finger tube, said handle portion having bolt holes in the second end thereof, a fitting overlying said second end of the handle portion, hollow bolts threaded in said bolt holes securing said fitting to said second end of the handle portion, said fitting having a depending leg with a pair of passages therein communicating with the hollow bolts, short tubes extending from opposite sides of said leg of the fitting registering with the passages therein, a cap carried on the outer end of each short tube, fuel and oxygen supply canisters having ends fitting said caps for detachably supporting said ends of fuel and oxygen supply canisters to said caps and means carried by said caps to release fuel and oxygen from the suspended canisters through the short tubes, the fitting, the hollow bolts, the handle, and the finger tube to the burner head.

5. The unit of claim 4 wherein the mans for suspending the canisters on the caps are snap rings.

6. A cutting and welding torch comprising a torch body having an elongated handle portion with hoses extending from the rear end thereof, a fitting detachably connected to the remote ends of the hoses, said fitting having a depending leg portion with passages for fuel and oxygen, a tube extending laterally from each passage, caps suspended from the tubes, fuel and oxygen supply canisters suspended from said caps, and means on said caps for activating said canisters whereby fuel and oxygen will be supplied from the respective canisters to the fitting and through the hoses to the torch.

7. A portable torch unit comprising a torch body having a rear end with fuel and oxygen passages communicating therewith and a torch tip projecting from the opposite end receiving fuel and oxygen from said passages, a fitting bolted to the said rear end of the body having passages communicating with the passages in the body, a tube extending laterally from each passage, caps carried by the tubes each communicating with a passage in the tube, a fuel supply canister having an end received by one of said caps, a heat shielded chlorate candle oxygen generator having an end received by the other of said caps, means in said caps releasably securing the canisters in sealed relation therewith, and the cap suspending the oxygen generator having an activator for activating the generator.

8. A portable torch unit comprising a torch body, a fitting on said body having a pair of passages, a tube extending laterally from each passage, a cap at the end of each tube a fuel supplying canister releasably suspended from one cap, a separate oxygen generator canister releasably suspended from the other cap, and a heat shield surrounding the oxygen generator canister.

* * * * *